United States Patent Office 2,700,013
Patented Jan. 18, 1955

2,700,013

CATALYTIC UPGRADING OF GASOLINE AND NAPHTHAS

Alex G. Oblad, Springfield, Thomas H. Milliken, Jr., Moylan, and Heinz Heinemann, Drexel Hill, Pa., assignors to Houdry Process Corporation, Wilmington, Del., a corporation of Delaware No Drawing. Application June 14, 1950,
Serial No. 168,152

3 Claims. (Cl. 196—50)

The present invention relates to catalytic processes for treatment of hydrocarbons and is more particularly concerned with improvements and methods for the production from low grade gasoline and naphtha of products of improved quality including enhanced octane rating. More specifically the invention is directed to improvements in these processes effected by contacting these hydrocarbon fractions with catalysts having the dual function of promoting carbon-carbon scission and hydrogenation, in the presence of hydrogen and under selected conditions including super atmospheric pressure.

Operations have been described in the literature and in prior patents wherein hydrocarbon fractions, such as those boiling in about the gasoline range, are contacted with a dehydrogenating catalyst such as alumina-molybdenum oxide in the presence of added hydrogen. These operations when conducted under appropriate processing conditions effect dehydrogenation of naphthenes present in the charge; cyclization of paraffins does not occur to any significant extent. These processes are therefore of interest only with selected gasoline and naphtha fractions, such as those which are essentially naphthenic. Hydrogen may be and usually is recycled to the process for the purpose only of maintaining catalyst activity, since the process results in substantial net hydrogen production. In operation of the process the catalyst acquires a deposit of carbonaceous or hydrocarbonaceous deposit called "coke," and progressively depreciates in activity or selectivity for the required reaction. After an appropriate period of operation, accordingly, the catalyst is subjected to regeneration with an oxygen-containing gas, thereby removing the coke by combustion.

Among the objects of the present invention are to provide an improved process for the upgrading of gasoline and naphtha applicable to a wide range of different types of charge stocks and wherein the desired improvement in octane rating is obtained with reduced loss of desired liquid products to the formation of coke and low molecular weight gases.

In accordance with the present invention the upgrading of gasoline and naphtha fractions is effected by contacting the same with selected dual function catalysts in the presence of controlled quantities of added hydrogen, at temperatures broadly in the range of 850–1050° F., and under pressures ranging from 50 to about 250 atmospheres. The dual function catalyst employed is one comprising an active cracking component and intimately associated or chemically combined proper minor amounts of a component having activity in promoting hydrogenation-dehydrogenation reactions, referred to herein as a "hydrogenating" component. The active cracking component can be any of the known cracking catalysts having at least moderate stable activity in cracking of a gas oil, including activated clay such as acid activated subbentonite clay of commerce, and synthetic siliceous composites containing predominantly silica, generally in gel form, associated with one or more non-reducible metal oxides such as alumina, magnesia, zirconia, beryllia or the like. The cracking component is one containing at least 70% by weight silica. The hydrogenating component must be one which per se or when in association with one of the compounds present in the cracking component catalyzes hydrogenation reactions; typical examples of which are oxides of molybdenum, chromium, vanadium, tungsten, nickel and cobalt, and sulfides of tungsten, molybdenum and cobalt; metals such as platinum and palladium. The hydrogenating component may be in a lower valence state in use than in the starting or regenerated catalyst; thus molybdenum oxides may be converted to lower oxidized state, or nickel oxide may be reduced to metallic state.

The siliceous cracking components described have at least moderate cracking activity in the conversion of gas oil, characteristically producing in such operation more than 25% by volume of liquid products in the gasoline boiling range. The dehydrogenating components should be present in minor amount in the dual function catalyst composite, generally not in excess of 3% by weight of the catalyst (on a water-free basis). The catalysts of the invention therefore contain at least about 70% by weight silica and up to about 3% by weight of a hydrogenating component. For superior or optimum results the proportionate quantity of the hydrogenating component should bear a definite relation to the activity of the cracking component, as is described below. The activity of the cracking component is related to its acidity as determined by the capacity of this component for chemisorption of quinoline by contact with quinoline vapors. Accordingly, in determining the amount of hydrogenating component to be added thereto in the preparation of superior catalysts for use in accordance with the present invention, the initial activity of the cracking component may be measured by its chemisorption capacity for quinoline.

The following procedure may be employed in determining the quinoline number of the catalyst:

The catalyst is suspended in a perforated glass basket by a glass wire attached to one end of the beam of an analytical balance. Nitrogen at a constant pressure is then passed through a series of saturators containing liquid quinoline maintained at a constant temperature by a jacket containing boiling liquid. The nitrogen gas saturated with quinoline is passed through preheated vapor transfer lines into contact with the catalyst sample. Flow is continued until a relatively constant weight is observed, and a stream of preheated nitrogen gas is then passed over the catalyst to remove physically held quinoline until a substantially constant weight is observed. The difference in weight before contact with quinoline and after the nitrogen purge is taken as the amount of quinoline chemisorbed.

Catalysts preferred for use in the upgrading of gasoline and naphtha in accordance with the invention are those in which the cracking component has a quinoline number of at least 0.02 and contain from about 0.3% to 3% of an active hydrogenating component such as molybdena. With other hydrogenative components the optimum amount of hydrogenating component for a given cracking component will vary depending on the specific activity of the component used. For nickel oxide, for example, amounts will vary from 0.1 to 3%.

A preferred catalyst for use in the present invention is silica-alumina gel having the indicated cracking activity and containing from about 0.5 to about 2% molybdena. Increased amounts of molybdena tend to favor the production of coke in increasing quantities such as to preclude operation as a non-regenerating process. Catalysts having about 2% $MoO_3$ showed optimum octane increase at desirably high yields of liquid products.

The best results in the operation of the invention are obtained when the proper rate of feeding the oil with respect to the catalyst is employed. With decreasing space velocity the octane numbers of the recovered liquid products progressively show an increase, but the use of liquid hourly space velocities below about 3 volumes of oil per volume of catalyst is not recommended, since at such lower space velocities there is a tendency toward excessive cracking of the charge with the loss of yields of gasoline to the production of highly increased quantities of low molecular weight gases, which will be accompanied by material increase in coke production. Space velocities going up to about 10 volumes of oil per volume of catalyst can be employed. Maximum increase in octanes at desirably high liquid recovery levels is obtained at a liquid hourly space rate of about 4–6 volume of oil per volume of catalyst.

The amount of coke formed in the process when operating under the described conditions is quite negligible, so that the same may be practiced continuously without interruption for regeneration of the catalyst, since the activity of the catalyst is retained over sufficiently long on-stream periods of months or more, which render such operation feasible. If desired, all or a portion of the catalyst may be regenerated or reactivated from time to time, such as by combustion in oxygen-containing gas in known manner.

EXAMPLE I

An East Texas naphtha boiling in the range of 264 to 402° F., of 49.1° API gravity and having an octane number of 35.7 (CFR-M) was passed over a catalyst prepared from silica-alumina gel (87.5 $SiO_2$/12.5 $Al_2O_3$ by weight) in the form of cylindrical pellets having an apparent bulky density of 600 grams per liter, 4 mm. in diameter and of like length, impregnated with 0.6% by weight molybdenum oxides (determined as $MoO_3$). The treatment of the naphtha was carried out under the following average operating conditions; temperature of 850° F., pressure of 1500 p. s. i. gauge, at a liquid space velocity of 6 volumes of oil per volume of catalyst per hour, hydrogen being added at the rate of 4 mols $H_2$ per mol of oil (average molecular weight 135) obtaining the following yield on a loss free basis.

*Table 1*

|  | at liquid space rate (vol./vol./hr.) | | | |
|---|---|---|---|---|
|  | 6 | 3 | 4 | 10 |
| Gasoline ($C_4+$): |  |  |  |  |
| vol. percent charge | 98.5 | 102 | 105.2 | 102.3 |
| wt. percent charge | 93.7 | 89.1 | 92.6 | 98.1 |
| Olefins in gasoline, wt. percent | 1.0 | 1.0 | 1.0 | 1.0 |
| Octane No.:* |  |  |  |  |
| CFR-M | 65.4 | 75.2 | 72.6 | 55.9 |
| CFR-R | 73.3 | 78.8 | 78.3 |  |
| Dry gas, wt. percent charge | 5.6 | 10.3 | 6.7 | 6.2 |
| Gaso. ($C_5+$) Octane-CFR-M |  | 72.0 | 70.1 |  |

*Octane Nos. on weathered sample.

The octane numbers of the obtained gasoline show a progressive increase with decreasing liquid space velocity, but it was not found desirable to reduce the space velocity below about 3 volumes of liquid charge per volume of catalyst per hour, since below this rate liquid yields are disproportionately reduced as a result of increased cracking taking place, with the formation of increased amounts of low molecular weight gases and a tendency toward the production of amounts of coke which become significant in limiting the process. With increasing motor octane rating the spread between motor and research octane numbers becomes progressively smaller.

At the same operating temperature, it was found, that lowering the pressure resulted in reduced gasoline yields and lower octanes for the liquid product, accompanied by increased production of fixed gas; these effects of lower pressure are compensated in part by corresponding increase in temperature. From the observed trends it appears that when operating at pressures of 1000 p. s. i. gauge or less, for the production of acceptable yields of gasoline of desired improved octane rating, temperatures in the order of 950° F. or greater should be employed.

It was also observed that as the length of the on stream period was increased, maintaining space velocity and other operating conditions constant, the extent of conversion remained about the same or showed some increase, with the octane numbers undergoing relatively little change or increasing slightly.

The effect of varying the quantity of active hydrogenating component with respect to the cracking component of the catalyst will be apparent from the following table showing results obtained in reforming the same East Texas naphtha employed in the preceding example, operating at a temperature of 850° F., under a pressure of 1500 p. s. i. gauge, at a liquid hourly space velocity of 6 volumes of oil per volume of catalyst, 4 mols of hydrogen per mol of oil being added with the charge. The catalyst employed was a pelleted silica-alumina gel (87.5$SiO_2$/12.5$Al_2O_3$) containing various amounts of molybdena, determined as $Mo_3$, by weight of silica-alumina, shown in the table.

*Table 2*
YIELDS

| $MoO_3$ wt. percent (on $SiO_2$/$Al_2O_3$) | Gasoline+$C_4$ | | Octane No. | |
|---|---|---|---|---|
|  | Wt. percent | Vol. percent | CFR-M | CFR-R |
| 0.6 | 93.7 | 98.5 | 65.4 | 73.3 |
| 2.1 | 90.4 | 97.8 | 73.5 |  |
| 3.9 | 98.6 | 101.0 | 45.3 | 53.3 |

Although in the described process for upgrading the quality of gasoline there may be and generally is a net production of hydrogen on a no loss basis, the addition of hydrogen with the charge has nevertheless been found essential to the operation. The desired low coke production is obtained when the partial pressure of hydrogen is maintained above about 750 pounds per square inch, which involves the addition of at least about 3 mols of hydrogen per mol of naphtha or gasoline charged. Increased amounts of hydrogen in excess of about 6/1 mol ratio have shown no particular advantage in the process.

The catalyst employed in the above examples was prepared by dissolving an appropriate amount of ammonium molybdate in that quantity of water which would be taken up by the catalyst while appearing dry (approximately 50 cc. $H_2O$ per 100 grams of catalyst) and impregnating the catalyst with the solution until the water was completely soaked up. The impregnated catalyst was then dried and heated to 1000° F. in a muffle furnace for 3 hours. The initial silica-alumina pellets subjected to impregnation were of the commercial type prepared by coprecipitation of sodium silicate and sodium aluminate in the presence of ammonium sulfate solution furnishing an amount of sulfate anion equal to the stoichiometric equivalent of the total alkali metal content of the silicate and aluminate solutions, and under conditions resulting in the formation of a coagulum having a pH of approximately 9.7 and containing about 3.9% by weight of Na (water washed and dried basis). The product was steamed, dried at 240–260° F. and coarse ground. The obtained coarse granules were treated in a countercurrent system with ammonium nitrate solution and water to remove sodium, then freed of excess water on a filter press. About ⅓ of the filter cake was dried and pulverized, then mulled with the remaining wet filter cake to form a paste which was molded into cylindrical pellets of the required size and the pellets dried at 220 to 240° F. Prior to treatment with ammonium molybdate solution the pellets were treated in air at 1400° F. for four hours. The heat-treated catalyst pellets thus prepared, and prior to impregnation with molybdena, had a quinoline number of .06 milliequivalents per gram.

Among the various siliceous cracking catalysts suitable as components for impregnation with the described quantities of molybdenum oxide or other hydrogenating components in the preparation of catalysts for use in accordance with the invention, there are included synthetic gels of silica-alumina; silica-alumina gels containing a refractory third metal oxide active in combination therewith, such as zirconia, beryllia, magnesia, thoria; composites prepared from hydrous silica with one of these specified refractory oxides. Also useful, but not necessarily equivalent to these synthetic composites are the natural hydrosilicates of aluminum and/or magnesium having adequate cracking activity, including acid-activated clay, particularly of the sub-bentonite type. There also come into consideration active composites of clay with added synthetic metal oxides, such as alumina.

The process is applicable to the upgrading of liquid hydrocarbons boiling in the range of gasoline and naphthas, as those boiling up to about 500° F., from any source; including appropriate cuts from a virgin stock or from thermal cracking, as well as gasoline and naphthas of synthetic origin. The process offers important advantages in its wide applicability not only to the improvement of naphthenic stocks, but also in the treatment of highly paraffinic gasoline and naphthas.

Obviously many modifications and variations of the invention as hereinbefore set forth may be made without departing from the spirit and scope thereof and therefore only such limitations should be imposed as are indicated in the appended claims.

We claim as our invention:

1. The method of improving the antiknock quality of gasoline by treatment of a selected petroleum fraction consisting essentially only of hydrocarbons in the gasoline boiling range, said treatment comprising subjecting such selected fraction to contact with a catalyst composite of an active siliceous cracking component containing at least 70% by weight $SiO_2$ and intimately associated with 0.5 to 2% by weight of the catalyst of molybdenum oxides determined as $MoO_3$; the contacting of said fraction and said catalyst being effected at a temperature of not less than 850° F., at a pressure in excess of 1000 pounds per square inch, at a liquid hourly space velocity of not less than 3, at least 3 mols of hydrogen per mol of hydrocarbon being added with the fraction charged.

2. The method in accordance with claim 1 wherein said catalyst is a silica alumina gel containing about 2% by weight molybdenum oxides determined as $MoO_3$.

3. The method in accordance with claim 1 wherein said hydrocarbon fraction is a thermally cracked gasoline.

References Cited in the file of this patent

UNITED STATES PATENTS

| Number | Name | Date |
|---|---|---|
| 2,341,792 | Kanhofer | Feb. 15, 1944 |
| 2,348,624 | Hillman | May 9, 1944 |
| 2,369,009 | Bloch et al. | Feb. 6, 1945 |
| 2,375,573 | Meier | May 8, 1945 |
| 2,464,539 | Voorhies et al. | Mar. 15, 1949 |
| 2,478,916 | Haensel | Aug. 16, 1949 |
| 2,487,564 | Layng | Nov. 8, 1949 |
| 2,585,337 | McKinley | Feb. 12, 1952 |